Sept. 27, 1955  L. H. HOLDEMAN  2,718,851
DROP PIT APPARATUS
Filed Feb. 28, 1950  3 Sheets-Sheet 3
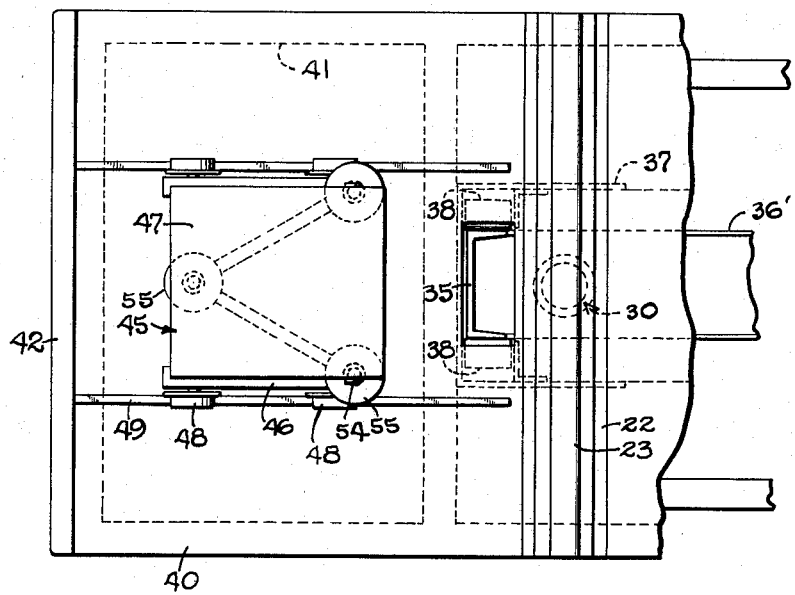
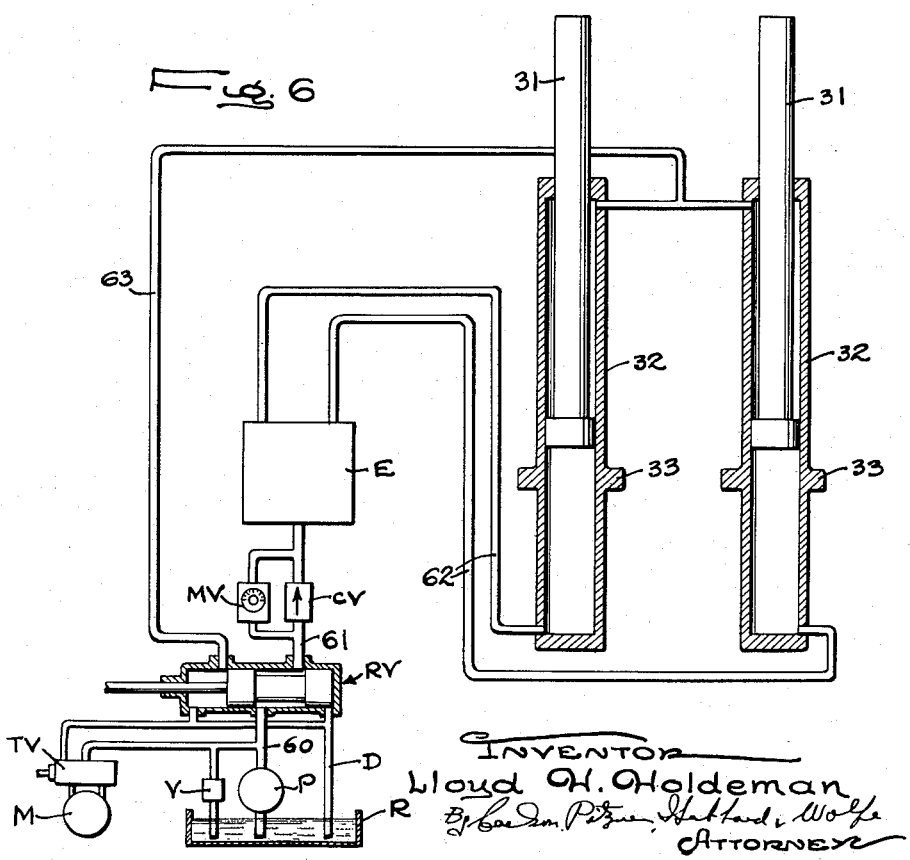
INVENTOR
Lloyd H. Holdeman
ATTORNEYS

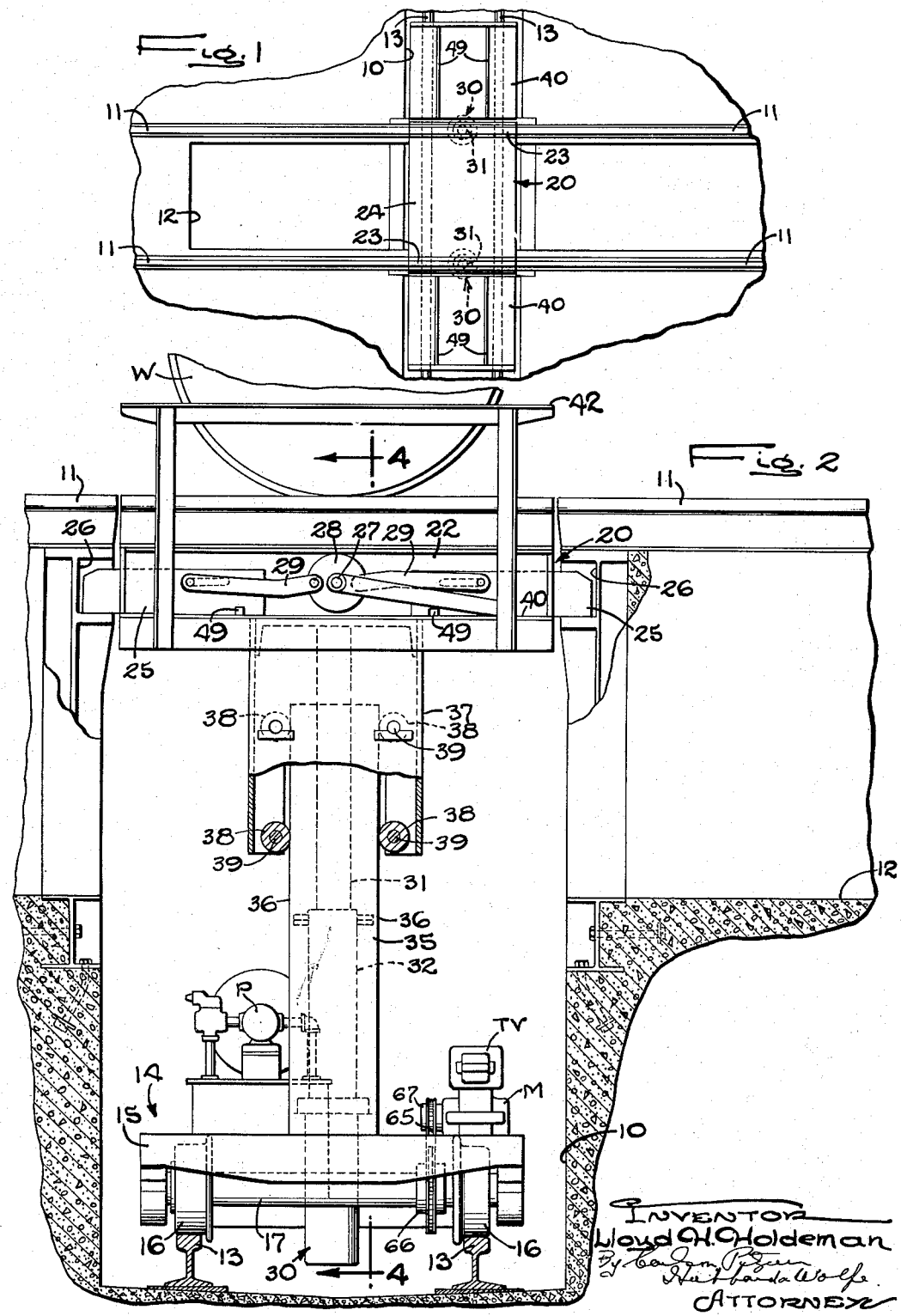

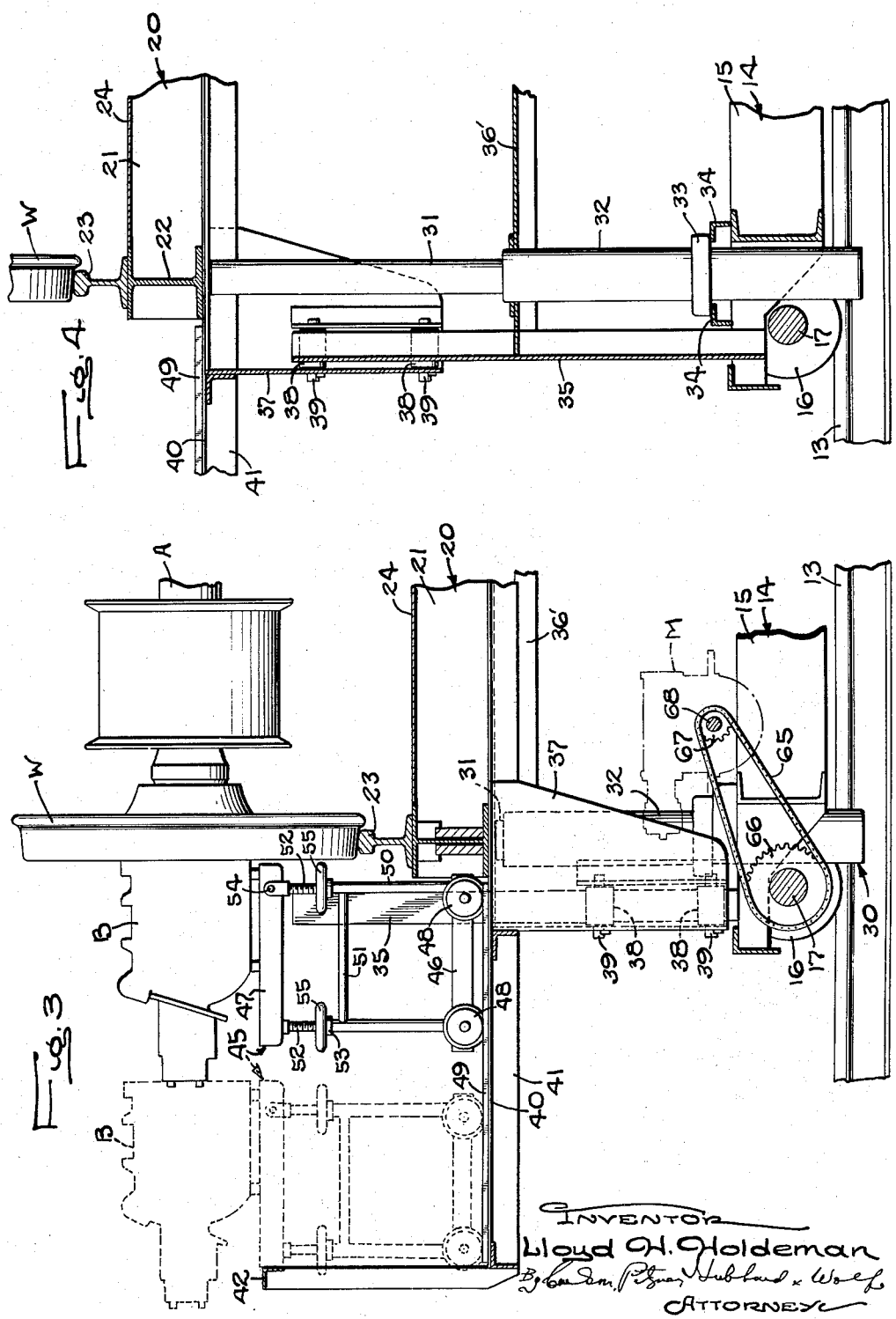

United States Patent Office 2,718,851
Patented Sept. 27, 1955

2,718,851

DROP PIT APPARATUS

Lloyd H. Holdeman, Muskegon, Mich., assignor to Manning, Maxwell & Moore, Inc., Muskegon, Mich., a corporation of New Jersey Application February 28, 1950, Serial No. 146,710

11 Claims. (Cl. 104—32)

The invention relates to apparatus for removing and replacing the wheels of passenger cars and similar railways vehicles, and more particularly to apparatus of the type adapted to operate in a pit intersecting a service track over which the vehicles may be run.

One object of the invention is to simplify the construction of drop pit apparatus of the above general character to better adapt it for servicing the running gear of modern passenger cars and similar railway vehicles.

Another object is to provide a unitary drop pit carriage and table organization including table-elevating mechanism which requires only a relatively narrow, shallow and inexpensive pit for its accommodation and which is readily adaptable for use in existing pits designed for use with air hoists.

Still another object is to provide improved table-elevating mechanism for drop pit carriages which affords very precise control of the table position and thus greatly facilitates assembly of wheel and axle sets and their associated journal boxes with the truck frames.

A further object is to provide improved apparatus facilitating the removal and replacement of car wheel journal boxes.

Other objects and advantages of the invention will become apparent from the following detailed description of the preferred embodiment illustrated in the accompanying drawings, in which:

Figure 1 is a fragmentary plan view of a drop pit installation equipped with a pit carriage and table structure embodying the features of the invention.

Fig. 2 is a sectional view taken transversely of the drop pit shown in Fig. 1 with the pit carriage and table structure shown in end elevation and the table located in pit-bridging position.

Fig. 3 is a fragmentary side elevational view of the carriage and table structure showing the apparatus as utilized for servicing journal boxes.

Fig. 4 is a fragmentary sectional view taken in a vertical plane substantially on the line 4—4 of Fig. 2.

Fig. 5 is a plan view of the auxiliary journal box handling apparatus forming a part of the pit carriage and table structure.

Fig. 6 is a diagram of the hydraulic circuit of the pit carriage and table structure.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

While the combined pit carriage and table structure constituting the present invention is of general utility in railway repair shops, it is particularly well adapted for the servicing of passenger cars and comparable vehicles and has been shown in the form best suited for that purpose. In the exemplary embodiment, the carriage and table structure is installed in a pit 10 (Figs. 1 and 2) intersecting and extending beneath a service track comprised of rails 11. Such service tracks are commonly provided with a relatively shallow inspection pit 12 below and parallel to the track. Usually the drop pit 10 extends across a plurality of the service tracks or transfer tracks between which vehicle wheels or other parts may be transferred by means of the carriage and table structure, a track consisting of rails 13 being provided in the pit for the accommodation of the carriage.

In accordance with the invention, the carriage and table structure is built as a simple compact unit containing its own power-driven mechanism for raising and lowering the table portion of the unit. The carriage portion of the unit, indicated generally at 14, comprises a rigid generally rectangular frame 15 having flanged wheels 16 at each end spaced apart to run on the pit track rails 13. As shown in Figs. 2 and 4, the wheels are mounted an axles 17 journaled in the side members of the frame.

The table portion 20 of the unit also comprises a generally rectangular frame including longitudinal beams 21 and transverse beams 22 welded or otherwise rigidly secured together. Rail sections 23 mounted on the upper face of the table, preferably directly over or on the transverse beams 22, are adapted to aline with the rails 11 of the service track to bridge the gap in that track when the table is positioned at the top of the pit as shown in Fig. 2. Vehicles to be services may therefore be run over the pit as required and the particular pair of wheels W to be serviced are spotted on the table as shown, preferably centrally of the table. For the convenience and safety of the workmen, the table may be closed between the rail sections by a suitable floor plate 24.

To relieve the carriage and the table supporting means of unnecessary strains and to insure proper alinement of the rail sections 23 with the rails 11 of the service track while the vehicle wheels are being spotted over the pit, means is provided for releasably latching the table 20 to the pit walls. The latch means as shown in Fig. 2 comprises a plurality of heavy latch bars 25 arranged in pairs at opposite sides of the table for movement laterally thereof into and out of suitable latch receiving pockets 26 provided in the pit walls. Preferably two pairs of latch bars are provided and these are respectively engaged in guides carried by the transverse beams 22. Projection and retraction of the latch members may be effected in any desired manner, for example by means of a manually rotatable shaft 27 journaled on the table and operatively connected with the latch bars by crank disks 28 and links 29.

Power-operated mechanism is provided on the carriage 14 for supporting the table 20 and for moving it vertically between a lower or transport position in which it is shown in Fig. 3, and a position slightly above the pit-bridging position in which it is shown in Fig. 2. Movement of the table to the latter position is utilized for compressing the truck springs of the vehicle being serviced so that the wheels may be disconnected from or connected with the truck. In the transport position, the load on the truck is lowered sufficiently to clear the vehicle on the service track so that it may be moved out from under the vehicle and transported to another service or transfer track if desired.

The table raising and lowering mechanism in its preferred form comprises a pair of power-operated lift devices 30 mounted on the carriage 14, each including a vertically movable member 31 positioned to engage the underside of the table 20 directly below the rail sections 23 and substantially in alinement with the center line of the table. Preferably the lift devices are of the pressure fluid operated type which are subject to very accurate control and therefore permit precise positioning of the table 20.

As herein shown the lift devices 30 comprise vertically disposed cylinders 32 respectively mounted at opposite ends of the carriage frame 15 directly below and substantially centered with respect to the transverse table beams 22. In the exemplary unit the cylinders 32 are provided with circumferential flanges 33 adapted to rest on cross members 34 (Fig. 4) to support the cylinders on the carriage frame. The vertically movable members 31 of the lift devices comprise plungers working in the cylinders 32 and projecting from the upper ends of the cylinders to engage and support the table 20.

Cooperating guide means is provided on the table 20 and carriage 14 for relieving the plungers 31 and cylinders 32 of lateral thrust and for retaining the table 20 in a horizontal position at all times. The guide means preferably comprises a pair of upright columns 35 mounted respectively at opposite ends of the carriage and each presenting a pair of opposed laterally facing guide surfaces 36. A rigid structural member such as a channel 36' extends between and is secured at opposite ends to the columns to reinforce and strengthen the structure. As will be seen by reference to Fig. 4, the reinforcing members are apertured for the reception of the cylinders 32.

Secured to the underside of the table 20 and depending therefrom are a pair of U-shaped brackets 37 each arranged to embrace one of the uprights 35. Each bracket carries a plurality of bearing elements, herein shown as rollers 38 rotatably supported on shafts 39 for coaction with the guide surfaces 36. It is desirable to provide at least two of the rollers for engagement with each side of the column 35, with the rollers of each pair spaced apart substantially in a vertical direction to minimize the strains on the parts.

The wheels W of passenger cars and similar vehicles are ordinarily press-fitted on an axle A (Fig. 3) with the ends of the axle projecting beyond the outer faces of the wheels for engagement in journal boxes B. The journal boxes are yieldably mounted and removably secured in the vehicle trucks in well-known manner. Like other parts subject to wear, the journal boxes must be removed from time to time for replacement or repair.

The carriage and table structure of the present invention is constructed and arranged with a particular view to facilitating removal and replacement of the journal boxes B. For this purpose the table 20 is provided at each end with extensions or platforms 40 of substantially the same width as the table. The platforms may conveniently be supported on angle bars 41 or similar structural members secured to the underside of the table and projecting at each end. For increased safety each platform is desirably provided at its outer end with a guard rail 42.

Supported on each of the platforms 40 for movement toward and from the table 20 is a jacking device 45. The arrangement is such that the jacking device may be run up close to the wheel W, as shown in full lines in Fig. 3, for transfer of the journal box B thereto. Thereafter the device may be shifted away from the wheel to free the journal box from the axle A, as shown in broken lines in the drawing. The journal box so freed may then be lifted from the device by a hoist or in any other preferred manner.

The jacking device 45 as herein shown comprises a wheeled base or dolly 46 carrying a vertically adjustable stage 47 for engaging and supporting the journal box B. To facilitate its movement, the dolly 46 is equipped with flanged wheels 48 running on guides or rails 49 carried by the platform 40.

Adjustable support for the stage 47 is provided by a plurality of upright tubular posts or standards 50 mounted on the dolly 46. Preferably three such posts are provided and these are arranged in a triangular formation, as shown in Fig. 5, with reinforcing bars 51 adjacent their upper ends to afford strength and rigidity. Slidable axially in each post but restrained against rotation relative thereto is an adjustable screw 52 threaded through a nut 53 adapted to rest on the upper end of the post. As herein shown, two of the screws 52, that is those nearest the table 20, are pivotally secured to the stage 47 as by pins 54 so that the stage may tilt on an axis disposed transversely of the table. The other screw abuts the underside of the stage to support its free end. For convenience of operation the nut elements 53 are formed with enlarged peripheral flanges 55 constituting hand wheels for rotating the units.

To remove a journal box from a wheel and axle set spotted on the table 20, the jacking device with the stage 47 in a lowered position is moved into the full line position shown in Fig. 3 so as to underlie the journal box. It will be understood, of course, that the journal box has previously been disconnected from the vehicle truck in the usual manner. Adjusting nuts 53 are then rotated to raise the stage 47 sufficiently to support the weight of the journal box. The journal box may then be removed from the axle by simply pulling the jacking device outwardly to the position shown in dotted lines. In this position it is conveniently accessible for removal from the apparatus.

In replacing a journal box, the steps above described are carried out in the reverse order. Thus the box is placed on the dolly with the latter in the dotted line position. The stage 47 is then adjusted either up or down as required to aline the box with the axle, and the jacking device is then shifted bodily forwardly to carry the box into position. Accurate alinement of the box and the axle can be quickly effected through manipulation of the adjusting nuts 53.

While pressure fluid from any suitable source may be employed for the operation of the lift devices 30, it is preferred to equip the carriage 14 with a self-contained pressure fluid supply system and all necessary controls. A suitable pressure fluid system for this purpose as shown in Fig. 6 includes a motor-driven pump P adapted to draw fluid such as oil from a sump or reservoir R and discharge it under pressure into a supply conduit 60. A relief valve V associated with the conduit 60 prevents excessive pressure build-up in the system.

A two-position reversing valve RV is operative in one position to direct fluid from the supply conduit 60 by way of a conduit 61, check valve CV, flow equalizer E and conduits 62 to the lower ends of the cylinders 32. In this position the valve RV also connects a conduit 63 communicating with the upper ends of the cylinders to an exhaust or drain conduit D. Pressure fluid delivered to the cylinders shifts the plungers 31 upwardly, thus raising the table 20. The flow equalizer E, which may be of the various well-known types available, insures uniform flow of fluid to each cylinder and thus maintains the table level under all load conditions.

To lower the table the valve RV is shifted to its alternate position, thus connecting the supply conduit 60 to the conduit 63 so that pressure fluid is delivered to the upper end of the cylinders 32. Conduits 62 leading from the lower ends of the cylinders are then connected to the drain D, the connection in this instance including a metering valve MV connected in parallel with the check valve CV. The metering valve is preferably adjustable to regulate the rate of discharge from the cylinders and thus determines the rate of descent of the table.

Pressure fluid operated means, such as a rotary hydraulic motor M supplied with fluid by the pump P may be utilized for traversing the carriage 15 along the pit track 13. As shown in Fig. 3 the motor M is arranged to drive the carriage through the medium of a chain 65 running over sprocket wheels 66 and 67 fixed respectively on the axle 17 and the motor shaft 68. A suitable traverse control valve TV is provided for starting and stopping the motor M and for determining its direction of operation.

It will be apparent from the foregoing that the invention provides drop pit apparatus of a novel and advantageous character for servicing the running gear of passenger cars and comparable railway vehicles. The mechanism is simple in construction and very compact, and may be adapted readily for use in existing pits of the type commonly provided in car shops for use with air hoists. The table raising and lowering mechanism provided in the apparatus affords precise control of the table position and thus greatly facilitates the removal and replacement of wheel and axle sets. Moreover, the removal and replacement of car wheel journal boxes is also greatly facilitated by the novel jacking device arrangement incorporated in the structure.

I claim as my invention:

1. Apparatus for use in a pit intersecting and extending beneath a service track and having rails providing a pit track disposed generally transversely of the service track, said apparatus comprising, in combination, a wheeled carriage adapted to run on the pit track, a rigid table structure dimensioned to fit within the pit and having means for supporting a pair of rails spaced apart to aline with the rails of the service track, retractable latch members on said table structure engageable with the pit walls for releasably latching the table structure thereto adjacent the top of the pit with said pair of rails bridging the gap in the service track, means supporting said table structure on said carriage for movement vertically from said pit-bridging position, said supporting means including a pair of power-actuated lift devices mounted on the carriage substantially in alinement with the centerline of the table and respectively positioned to engage the table directly below the rails supported thereon, guide means for retaining said table in a horizontal position and for minimizing lateral thrust on said lift devices comprising a pair of upright columns mounted respectively at opposite ends of said carriage, and brackets depending from said table each carrying a plurality of rollers spaced apart vertically and positioned for operative engagement with opposite side edges of said columns.

2. Apparatus for use in a pit intersecting and extending beneath a service track and having rails providing a pit track disposed generally transversely of the service track, said apparatus comprising, in combination, a wheeled carriage adapted to run on the pit track, a rigid table structure dimensioned to fit within the pit and having means for supporting a pair of rails spaced apart to aline with the rails of the service track, retractable latch members on said table structure engageable with the pit walls for releasably latching the table structure thereto adjacent the top of the pit with said pair of rails bridging the gap in the service track, means for raising and lowering said table including a pair of cylinders mounted on said carriage with their axis vertical and substantially in alinement with the centerline of the table, a plunger in each cylinder projecting from the upper end of the cylinder for engagement with the underside of the table, said cylinders being positioned so as to locate said plungers directly below and in alinement with the rails supported on the table, means for controlling the supply of pressure fluid to and exhaust of fluid from said cylinders, and cooperating guide means on said carriage and said table for relieving said plungers and cylinders of lateral thrust.

3. Apparatus for use in a pit intersecting and extending beneath a service track and having rails providing a pit track disposed generally transversely of the service track, said apparatus comprising, in combination, a wheeled carriage adapted to run on the pit track, a rigid table structure dimensioned to fit within the pit and having means for supporting a pair of rails spaced apart to aline with the rails of the service track, retractable latch members on said table structure engageable with the pit walls for releasably latching the table structure thereto adjacent the top of the pit with said pair of rails bridging the gap in the service track, means on said carriage for raising and lowering said table including a pair of vertically movable members respectively positioned to engage the underside of said table directly below said rails and substantially centrally of the table, and guide means on said table cooperating with guide members on said carriage for maintaining said vertically movable members free of lateral thrust.

4. Apparatus for use in a pit intersecting and extending beneath a service track and having rails providing a pit track disposed generally transversely of the service track, said apparatus comprising, in combination, a wheeled carriage adapted to run on the pit track, a rigid table structure dimensioned to fit within the pit and having means for supporting a pair of rails spaced apart to aline with the rails of the service track, retractable latch members on said table structure engageable with the pit walls for releasably latching the table structure thereto adjacent the top of the pit with said pair of rails bridging the gap in the service track, means on said carriage for raising and lowering said table including a pair of vertically movable members respectively positioned to engage the underside of said table directly below said rails and substantially centrally of the table, guide means for relieving said vertically movable members of lateral thrust comprising a pair of rigid members extending upwardly from said carriage adjacent opposite ends thereof, each of said rigid members presenting a pair of vertically disposed laterally facing bearing surfaces, and brackets depending from said table having bearing elements engageable with each of said bearing surfaces at two vertically spaced points.

5. Apparatus for use in a pit intersecting and extending beneath a service track and having rails providing a pit track disposed generally transversely of the service track, said apparatus comprising, in combination, a wheeled carriage adapted to run on the pit track, a rigid table structure dimensioned to fit within the pit and having means for supporting a pair of rails spaced apart to aline with the rails of the service track, retractable latch members on said table structure engageable with the pit walls for releasably latching the table structure thereto adjacent the top of the pit with said pair of rails bridging the gap in the service track, means on said carriage for raising and lowering said table including a pair of vertically movable members respectively positioned to engage the underside of said table directly below said rails and substantially centrally of the table, guide means for relieving said vertically movable members of lateral thrust comprising a pair of rigid members extending upwardly from said carriage adjacent opposite ends thereof, each of said rigid members presenting a pair of vertically disposed laterally facing bearing surfaces, brackets depending from said table adjacent said rigid members, and a plurality of roller elements mounted on said brackets for engagement with said bearing surfaces, the roller elements on each bracket being arranged in pairs disposed on opposite sides of the rigid members with the elements of each pair spaced apart vertically.

6. Apparatus for removing and replacing the wheel and axle sets and journal boxes of railway vehicles comprising, in combination with a service track interrupted by a transversely disposed drop pit, a table structure dimensioned to fit within the pit and having means for temporarily latching it in a position adjacent the top of the pit, said table structure having means for carrying a track section adapted to aline with the service track so that a vehicle may be run over the pit to spot the wheels to be serviced spotted on the table, a platform at each end of the table, and a vertically adjustable jacking device supported on each platform below one of the journal boxes for movement in a direction to withdraw the journal boxes from the axle with which they are associated.

7. Apparatus for removing and replacing the wheel and axle sets and journal boxes of railway vehicles comprising, in combination with a service track interrupted by a transversely disposed drop pit, a table structure dimensioned to fit within the pit and having means for temporarily latching it in a position adjacent the top of the pit, said table structure having means for carrying a track section adapted to aline with the service track so that a vehicle may be run over the pit to spot the wheels to be serviced spotted on the table, a platform at each end of the table, jacking devices operative to raise, lower and support a journal box, and means on each platform supporting and guiding one of said jacking devices for movement in a direction effective to withdraw or replace a journal box on the axle of a wheel set spotted on the table.

8. Drop pit apparatus comprising, in combination, a table adapted to bridge a pit intersecting a service track, said table having rails alined with the rails of the service track for supporting a wheel and axle set of a railway vehicle, auxiliary apparatus for handling the journal boxes associated with the wheel and axle set including platforms at each end of the table, vertically adjustable jacking devices, and means on each platform supporting and guiding one of said jacking devices for movement toward and from the table.

9. The combination with a drop pit table adapted to support a wheel and axle set of a railway vehicle, a platform projecting at one end of the table, a jacking device supported on said platform for movement toward and from the adjacent wheel of the set, said jacking device having a stage for supporting a journal box associated with the wheel set, and means for raising and lowering said stage.

10. A jacking device for car wheel journal boxes comprising, in combination, a wheeled base, a group of three tubular standards arranged in triangular conformation mounted on said base in an upright position, a screw-threaded member nonrotatably received in each of said standards for axial sliding movement, a nut threaded on each member adapted to rest on the upper end of the standard to support the member with its upper end projecting above the standard, means individual to the respective nuts for rotating them to individually adjust the members vertically, a journal box supporting stage dimensioned to overlie the projecting ends of said members, and means securing said stage to two of said members for pivotal movement about an axis disposed transversely of the stage, the other of said members abutting the underside of said stage to support the same.

11. A jacking device for car wheel journal boxes comprising, in combination, a wheeled bse, a group of three tubular standards arranged in triangular conformation mounted on said base in an upright position, a screw threaded member nonrotatably received in each of said standards for axial sliding movement, a nut threaded on each member adapted to rest on the upper end of the standard to support the member with its upper end projecting above the standard, said nuts being rotatable independently to individually adjust the members vertically, a journal box supporting stage dimensioned to overlie the projecting ends of said members, and means securing said stage to said members so that it may be tilted from the horizontal by manipulation of one of said nuts.

References Cited in the file of this patent

UNITED STATES PATENTS

| Re. 16,989 | Waters | June 5, 1928 |
| 1,876,922 | Hamilton | Sept. 13, 1932 |
| 1,927,598 | Schlichter | Sept. 19, 1933 |
| 2,178,632 | Holmes | Nov. 7, 1939 |
| 2,191,710 | Fones | Feb. 27, 1940 |